US009934569B2

United States Patent
Ye et al.

(10) Patent No.: US 9,934,569 B2
(45) Date of Patent: Apr. 3, 2018

(54) IMAGE PROCESSING METHOD AND APPARATUS FOR TRACKING A SITE IN A SERIES OF IMAGES

(71) Applicant: IMPERIAL INNOVATIONS LIMITED, London (GB)

(72) Inventors: Menglong Ye, London (GB); Stamatia Giannarou, London (GB); Guang-Zhong Yang, London (GB)

(73) Assignee: Imperial Innovations Limited, London (GB)

( * ) Notice: Subject to any disclaimer, the term of this patent is extended or adjusted under 35 U.S.C. 154(b) by 28 days.

(21) Appl. No.: 14/916,643

(22) PCT Filed: Sep. 4, 2014

(86) PCT No.: PCT/GB2014/052686
§ 371 (c)(1),
(2) Date: Mar. 4, 2016

(87) PCT Pub. No.: WO2015/033147
PCT Pub. Date: Mar. 12, 2015

(65) Prior Publication Data
US 2016/0196652 A1    Jul. 7, 2016

(30) Foreign Application Priority Data
Sep. 4, 2013   (GB) .................................. 1315763.1

(51) Int. Cl.
*G06K 9/00* (2006.01)
*G06T 7/00* (2017.01)
(Continued)

(52) U.S. Cl.
CPC ........ *G06T 7/0014* (2013.01); *G06K 9/00134* (2013.01); *G06K 9/6202* (2013.01);
(Continued)

(58) Field of Classification Search
CPC ............... G06K 9/00; G06T 7/00; H04N 5/00
(Continued)

(56) References Cited

U.S. PATENT DOCUMENTS 5,703,604 A  * 12/1997  McCutchen ........... G09G 3/003
                                                                345/8
5,982,909 A  * 11/1999  Erdem .................... G06T 7/251
                                                              348/169

(Continued)

FOREIGN PATENT DOCUMENTS

WO    WO 2015/033147         3/2015

OTHER PUBLICATIONS

International Search Report and the Written Opinion dated Jan. 19, 2015 From the International Searching Authority Re. Application No. PCT/GB2014/052686.

(Continued)

*Primary Examiner* — Abolfazl Tabatabai

(57) ABSTRACT

A computer implemented method for tracking a site in a series of images, the method comprising identifying a site to be tracked; selecting at least three non-collinear locations distributed around the sire in the reference image; selecting, from the reference image, a region of image data around each of the at least three non collinear locations; comparing each selected region with a second image and, based on these comparisons, identifying for each selected region a corresponding location in the second image, determining a single common affine transformation to map the at least three locations from the reference image onto the corresponding locations in the second image.

20 Claims, 5 Drawing Sheets

(51) Int. Cl.
*G06K 9/62* (2006.01)
*G06T 3/00* (2006.01)
*H04N 5/247* (2006.01)
*G06T 7/246* (2017.01)
*G06T 7/262* (2017.01)
*G06T 7/207* (2017.01)

(52) U.S. Cl.
CPC ............ *G06T 3/0006* (2013.01); *G06T 7/207* (2017.01); *G06T 7/248* (2017.01); *G06T 7/262* (2017.01); *H04N 5/247* (2013.01); *G06T 2207/10016* (2013.01); *G06T 2207/10056* (2013.01); *G06T 2207/10068* (2013.01); *G06T 2207/30028* (2013.01); *G06T 2207/30092* (2013.01)

(58) Field of Classification Search
USPC .......... 382/103, 104, 236; 348/169–172, 352
See application file for complete search history.

(56) References Cited

U.S. PATENT DOCUMENTS

| | | | |
|---|---|---|---|
| 6,792,071 B2 * | 9/2004 | Dewaele | G06T 7/0012 378/51 |
| 2003/0219147 A1 | 11/2003 | Nishiura | |
| 2009/0326359 A1 * | 12/2009 | Hendriks | A61B 5/0066 600/407 |

OTHER PUBLICATIONS

Patents Act 1977: Search Report Under Section 17 dated Mar. 13, 2014 From the Intellectual Property Office of the United Kingdom of Great Britain Re. Application No. GB1315763.1

Allain et al. "Re-Localisation of a Biopsy Site in Endoscopic Images and Characterisation of Its Uncertainty", Medical Image Analysis, XP055161286, 16(2):482-496, Available Online Dec. 2, 2011. Abstract, p. 482, r-h col., Line 5-p. 485, r-h col., Last Line.

Atasoy et al. "Probabilistic Region Matching in Narrow-Band Endoscopy for Targeted Optical Biopsy", Medical Image Computing and Computer-Assisted Intervention, MICCAI 2009, XP019130358, Part I, LNCS 5761: 499-506, Feb. 1, 2009. Abstract, p. 499, Last Para-p. 501, Last Line, Figs. 2, 3.

Fuh et al. "Affine Models for Image Matching and Motion Detection", Proceedings of the International Conference on Acoustics, Speech and Signal Processing, ICASSP-91, Toronto, Ontario, Canada, Apr. 14-17, 1991, 4(M3.13): 2409-2412, Apr. 1991.

Giannarou et al. "Probabilistic Tracking of Affine-Invariant Anisotropic Regions", IEEE Transactions on Pattern Analysis and Machine Intelligence, XP011490779, 35(1): 130-143, Published Online Mar. 22, 2012. Abstract, p. 130, l-h col., Line 1-p. 133, r-h col., Line 15, Fig. 2.

Mountney et al. "Optical Biopsy Mapping for Minimally Invasive Cancer Screening", Medical Image Computing and Computer-Assisted Intervention, MICCAI 2009, XP019130356, Part I, LNCS 5761: 483-490, Sep. 20, 2009. Abstract, p. 484, Line 5-p. 487, Line 11.

* cited by examiner

IMAGE PROCESSING METHOD AND APPARATUS FOR TRACKING A SITE IN A SERIES OF IMAGES

RELATED APPLICATIONS

This application is a National Phase of PCT Patent Application No. PCT/GB2014/052686 having International filing date of Sep. 4, 2014, which claims the benefit of priority of United Kingdom Patent Application No. 1315763.1 filed on Sep. 4, 2013. The contents of the above applications are all incorporated by reference as if fully set forth herein in their entirety.

SUMMARY OF THE INVENTION

The present disclosure relates to imaging, and in particular to methods and apparatus for co-registration of images and for the tracking of objects in an image, still more particularly the present disclosure relates to the tracking of objects in an image which may be subject to motion, deformation and changes of perspective and/or magnification of the imaging apparatus.

Aspects of the disclosure provide particular advantages in medical or surgical methods such as endoscopic methods, which may be performed on living or dead human or animal bodies. In addition, endoscopic methods and apparatus, and associated imaging methods may be applied in non-medical or surgical applications such as imaging in subterranean spaces such as mines or pipelines for the transportation of fluids, or in other confined spaces such as buildings. Other possible applications of the disclosure will be apparent to the skilled addressee in the context of the present disclosure.

It is desired to be able to track the position of an identified site in a series of images. Where the identified site may be subject to deformations, and the series of images may be acquired from different perspectives and/or with different magnifications, tracking the position of the site may be problematic.

Recent advances in microscopic detection techniques include fluorescence spectroscopy, fibred confocal microscopy and optical coherence tomography. These methods can be integrated with miniaturised probes to assist endoscopy, thus enabling diseases to be detected at an early and pre-invasive stage, forgoing the need for histopathological samples and off-line analysis. Since optical-based biopsy does not leave visible marks after sampling, it is important to track the biopsy sites to enable accurate retargeting and subsequent serial examination. In this paper, a novel approach is proposed for pathological site retargeting in gastroscopic examinations. The proposed method is based on affine deformation modelling with geometrical association combined with cascaded online learning and tracking, it provides online in vivo retargeting, and is able to track pathological sites in the presence of tissue deformation, it is also robust to partial occlusions and can be applied to a range of imaging probes including confocal laser endomicroscopy.

Gastroscopy is the gold-standard method of visualising the upper gastrointestinal tract. In addition to direct visualisation of the mucosa, the procedure enables the procurement of histological samples important for the diagnosis and assessment of gastrointestinal pathologies. Recently, there has been an increasing demand for in vivo, in situ real-time tissue characterisation and assessment. Techniques that enable microscopic detection and characterisation of tissue include fluorescence spectroscopy, fibred confocal microscopy, and optical coherence tomography. These methods can be packaged info miniaturised probes that can be deployed through endoscopic instrument channels. They allow changes that occur in diseases such as cancer to be detected at an early and pre-invasive stage (without taking histopathological tissue samples). One of the major problems with the use of probe-based systems is its small field-of-view, hence systematically screening larger surface areas with surface deformation, such as the oesophagus becomes difficult. Retargeting previously probed mucosal sites is also challenging due to the lack of visible marks left on the mucosal surface. Recent adoption of Narrow Band Imaging (NBI) enhances the visibility of mucosal features, allowing the possibility of using computer vision approaches to assist pathological site retargeting in examinations of the upper gastrointestinal tract.

For addressing the issue of accurate optical biopsy site retargeting, a number of problems exist, in particular the problem of tracking multiple biopsy sites in the presence of tissue deformation, tool-tissue interaction, and partial occlusion of images.

Aspects and examples of the present disclosure provide a new approach for pathological site retargeting during endoscopic examinations. As will be appreciated in the context of the present disclosure, whilst such retargeting methods have particular application in medical and surgical applications (where tissue deformations and physiological movements of a patient maybe an issue) they may be applied to any series of images where it is desired to track a particular site, such as a site at which a microscope image has been obtained. This may enable retargeting of that site for subsequent measurements and investigation.

In contrast to the previous methods, some embodiments of the proposed method enable online in vivo retargeting based on a learning-based tracker. A local geometrical association scheme is proposed to mitigate the problem of partial occlusion and feature drop-out during tracking, which also facilitates simultaneous tracking of multiple biopsy sites. The method may provide reliable retargeting of pathological sites in the presence of tissue deformation where existing methods such as SLAM fail.

In a first aspect there is provided a computer implemented method for tracking a site such as a site at which a microscope image has been obtained. This method comprises identifying a site to be tracked, for example by identifying, in a macroscopic reference image of a tissue, a site in which a microscope image has been obtained
- selecting at least three non-collinear locations distributed around the site in the reference image;
- selecting, from the reference image, a region of image data around each of the at least three non collinear locations;
- comparing each selected region with a second image and, based on these comparisons, identifying for each selected region a corresponding location in the second image,
- determining a single common affine transformation to map the at least three locations from the reference image onto the corresponding locations in the second image.

It has been appreciated that the site at which a microscope image has been obtained, for example a pathological site, may be treated as a locally rigid patch in the image frames. Accordingly, a common affine transformation can be defined to transform all of the three non collinear locations from the reference image to the second image (e.g. a single affine transformation can map all of the at least three locations between the two images). This common affine transform may be determined based on a least-squares match of the distribution (e.g. relative spatial position) of the non-collinear locations in the reference image to the corresponding locations in the second image. Accordingly, the same homography can be applied to all of the points inside a polygon defined by the at least three non-collinear locations to transform those points between the second image and the reference image. It will be understood in the context of the present disclosure that an affine transformation provides one way to estimate this homography.

The at least three non-collinear locations may comprise at least four non-collinear locations. For example, the at least four non-collinear locations may be selected to define a regular polygon in the reference image. The regular polygon may comprise a regular pentagon.

In a second aspect there is provided a computer implemented method for tracking a site such as a site at which a microscope image has been obtained. This method comprises identifying a site to be tracked, for example by identifying, in a macroscopic reference image of a tissue, a site in which a microscope image has been obtained; selecting at least four non collinear locations distributed around the site in the reference image, wherein the at least four non-collinear locations are selected to define a regular polygon in the reference image; comparing the reference image with a second image and, based on the comparison, identifying for each of the at least four non-collinear locations, a corresponding location in the second image, determining a common affine transformation to map the at least four locations from the reference image onto the corresponding locations in the second image.

The regular polygon may comprise a regular pentagon.

The method may further comprise selecting, from the reference image, a region of image data around each of the at least four non-collinear locations, wherein comparing the reference image with the second image comprises comparing each selected region with a second image and, based on these comparisons, identifying for each selected region a corresponding location in the second image.

The method may comprise selecting a plurality of sets of non-collinear locations. The locations of each set may correspond to the locations of at least one of the other sets rotated about a common centre of the locations. The locations of each set may be centred on (for example symmetric about) the identified site (e.g. the site at which the microscopic image was obtained). The angle of rotation between each set may be an integer multiple of a selected angle. Where the sets are selected to define a polygon the selected angle may be selected based on the rotational symmetry of the polygon.

The method may comprise determining, for each of the plurality of sets of locations in the reference image, a common affine transform that maps all of the locations of that set to a corresponding set of locations in the second image. For example this may provide a plurality of common affine transforms, each of which maps a set of the locations of the reference image to a corresponding set of locations in the second image.

In one possibility the method comprises determining a location of a site in the second image that corresponds to the identified site in the reference image based on the plurality of common affine transforms. For example, the plurality of affine transforms may be combined to provide a single affine transform which map the site in the reference image to a corresponding site in the second image.

In a third aspect there is provided a computer implemented method for tracking a site such as a site at which a microscope image has been obtained. This method comprises identifying a site to be tracked, for example by identifying, in a macroscopic reference image of a tissue, a site in which a microscope image has been obtained; selecting a plurality of sets of at least three non-collinear locations, wherein each set of locations is distributed around the site in the reference image; comparing the reference image with a second image and, based on the comparison, identifying for each set of at least three non-collinear locations, a corresponding set of locations in the second image, for each set, determining a common affine transformation to map the at least three locations of the set to the corresponding set of locations in the second image, thereby providing a plurality of affine transformations; combining the plurality of affine transforms to provide a single affine transform for transforming the identified site between the reference image and the second image.

The at least three non-collinear locations may comprise at least four non collinear locations. For example, the at least four non-collinear locations may be selected to define a regular polygon in the reference image. The regular polygon may comprise a regular pentagon.

The method may further comprise selecting, from the reference image, a region of image data around each non-collinear location of each set, wherein comparing the reference image with the second image comprises comparing each selected region with the second image and, based on these comparisons, identifying for each selected region of the set a corresponding location in the second image.

For example, comparing each selected region with the second image may comprise determining a correlation function between the selected region and the second image.

In some examples, the methods of the present disclosure comprise selecting a first group of non-collinear locations distributed around the identified site, and selecting a second group of non-collinear locations distributed around the identified site, wherein the first group is distributed around a smaller area of the image than the second group.

As will be appreciated each of these groups may comprise a set of at least three non-collinear locations, for example at least four non-collinear locations.

Methods of the disclosure may implemented using any suitable controller, such as a general purpose processor configured with a computer program product configured to program the processor to operate according to any one of the methods described herein. In addition, the functionality of such a processor may be provided by an application specific integrated circuit, ASIC, or by a field programmable gate array, FPGA, or by a configuration of logic gates, or by any other control apparatus.

Any aspects of the inventions, in so far as they are compatible, may be combined with any other aspects of the invention.

For example method aspects may be combined with apparatus aspects, and features described with reference to the operation of particular elements of apparatus may be provided in methods which do not use those particular types of apparatus. In addition, each of the features of each of the embodiments is intended to be separable from the features which it is described in combination with, unless if is expressly stated that some other feature is essential to its operation. Each of these separable features may of course be combined with any of the other features of the embodiment in which it is described, or with any of the other features or combination of features of any of the other embodiments described herein.

BRIEF DESCRIPTION OF THE SEVERAL VIEWS OF THE DRAWINGS

Some embodiments of the disclosure will now be described, by way of example only, with reference to the accompanying drawings: in which.

DESCRIPTION OF SPECIFIC EMBODIMENTS OF THE INVENTION

Figure 1:
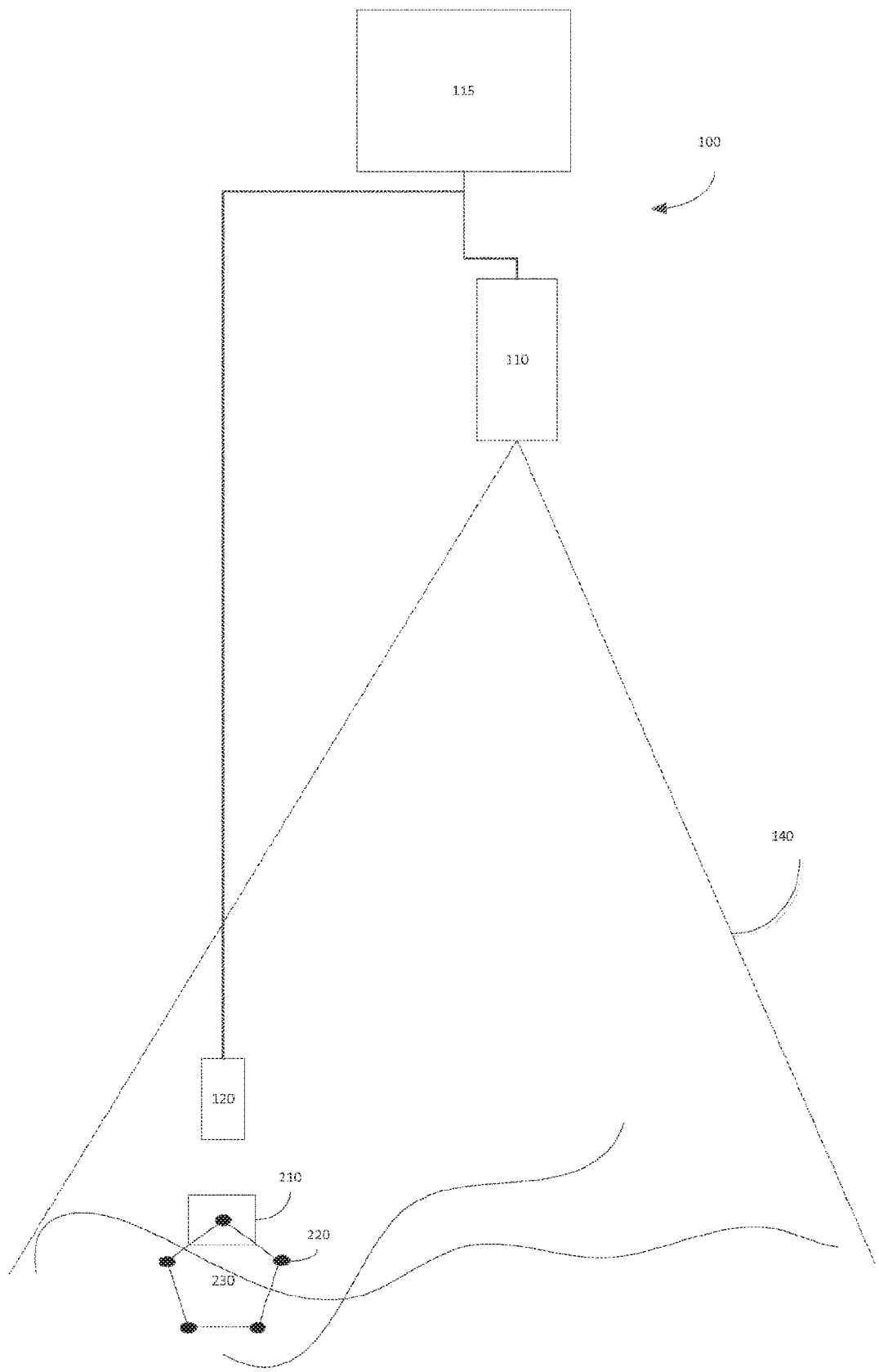
FIG. 1 shows an imaging apparatus.

FIG. 1 shows an apparatus 100 comprising a controller 115 coupled to a first imager 110 and coupled to a second imager 120.

The first imager 110 is adapted for obtaining images of a first field of view 140.

The second imager is adapted for obtaining images of a second field of view, that is smaller than the first field of view 140. The second imager 120 is operable to be moved within the first field of view 140 to obtain images of a local region of the first field of view.

The controller 115 is configured to obtain a series of images from the first imager 110 that comprise at least a reference image and a second image. The controller is further configured to identify, in the reference image, a site at which the second imager has obtained an image, and to determine the location of that site in the second image.

The first imager may comprise an endoscopic camera and the second imager may comprise a microscope such as a confocal laser microscope, and the apparatus is configured to perform probe-based Confocal Laser Endomicroscopy (pCLE).

In operation, the controller can then perform a method for tracking and re-identifying biopsy sites during probe-based Confocal Laser Endomicroscopy (pCLE) procedures.

The controller 115 identifies in a reference image, a site comprising 2D image coordinates of an optical biopsy site. This identification may be performed based on user input, or from tracking the position of the second imager 120 in the field of view 140. In the latter case, the optical biopsy site can be localised as the area on the tissue surface where the tip of the imaging probe touches when it comes in contact with the tissue.

The controller 115 then defines, in the reference image, a regular pentagon 230 of size rl centred at the 2D position of the optical biopsy site.

The locations of the vertices 220 of the pentagon are defined as the centres of surrounding regions 210 (associated sites) that can be independently tracked in subsequent images. This can be achieved using any tracking method that enables re-identification of a region, such as the Tracking-Learning-Detection approach. These associated sites 210 may comprise rectilinear regions, which may be square. Different shapes can also be used for the associated sites, depending on the method employed for tracking. The size of the associated sites 210 can be defined according to the image size.

The controller 115 is configured to rotate the pentagon 230 with respect to its centre by angles which are integer multiples of a selected angle e.g. θ, 2θ, ..., (n−1)θ, until nθ=72° (note the pentagon is rotationally symmetric), to define a set of pentagons—where n is the number of pentagons in the set. For each angle setting, five associated sites 210 are created for tracking. These provide at least three non collinear locations in most images. For example if one location is obscured, for example by movement of tissue or by the presence of the second imager, at least three non collinear locations may remain in an image being analysed.

These first sets of non collinear locations 220 provide a first level of associated sites 210. To take into account changes in scale (for example, camera zoom-in or zoom-out), the controller 115 is configured to define groups of pentagons, wherein each group comprises a plurality of sets of associated sites (at least three non collinear locations that can be tracked together).

The controller 115 is configured to define the groups so that they have different sizes in the reference image. For that purpose, a first group, as above may comprise pentagons of size r1, a second group may comprise pentagons of size r2, and a third group may comprise pentagons of size r3 (where r3>r2>r1). These groups of sets of non-collinear locations are used to create the 2nd and 3rd level of the associated sites, respectively.

The controller 115 then compares the associated sites (e.g. regions of image data around the non collinear locations) of each pentagon with an image from the series of images obtained by the first imager 110. The controller is configured to determine, based on this comparison and a least-squares method, an affine transformation from the reference image to the current frame. For example, a common affine transform may be determined by finding a single common affine transformation that provides a best least-squares match of the location of each set of non-collinear locations in the reference image to the corresponding set of locations in the second image.

The determined affine transformation can then be applied to the optical biopsy site on the reference image to calculate a candidate position of the biopsy site in the current image.

To provide a collection of candidate sites, each set of at least three non-collinear locations (e.g. each pentagon that is sufficiently identifiable to provide an affine transformation) may be treated in this way to provide a separate affine transformation. The controller 115 is configured to determine the final coordinates of the identified site in the current frame based on the median values of all the candidate sites.

To determine the affine transform, the controller 115 may be configured to operate under the constraint that the shape of the non-collinear locations is rigid. This constraint provides that a single (common) affine transform can be applied to all of the non-collinear locations, and to the image locations which are surrounded by those non collinear locations (e.g. within a polygon having those locations at its vertices), to transform from an image back to the reference image.

Although the sets of non-collinear locations, and the regions (associated sites) around them are described as being arranged as pentagons, this is optional and other geometric arrangements of the sites may be used. Other examples and variations will be apparent to the skilled reader in the context of the present disclosure.

Figure 2A:
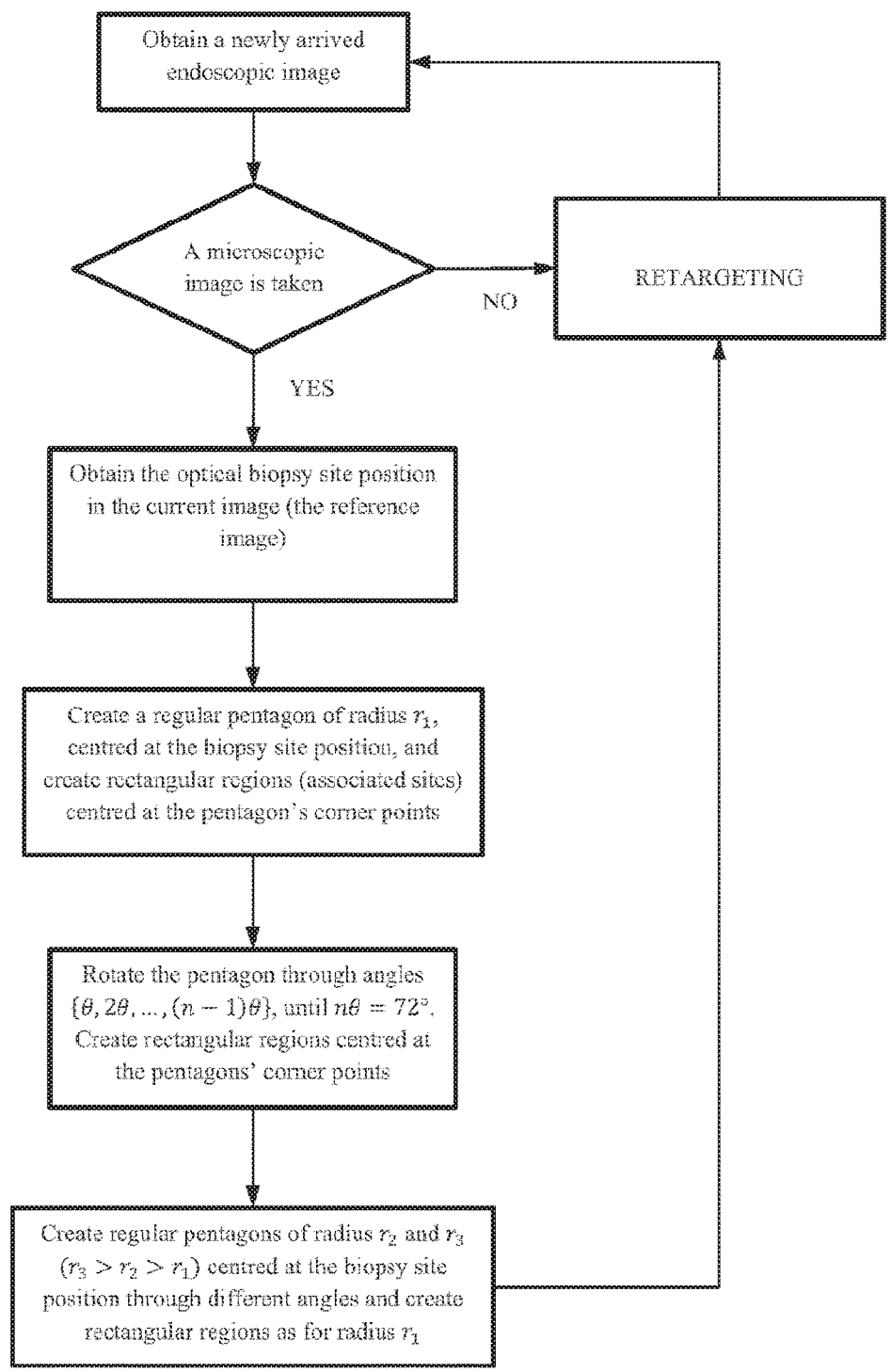
FIG. 2A and FIG. 2B show a flow charts illustrating methods of operating the apparatus of FIG. 1.
Figure 2B:
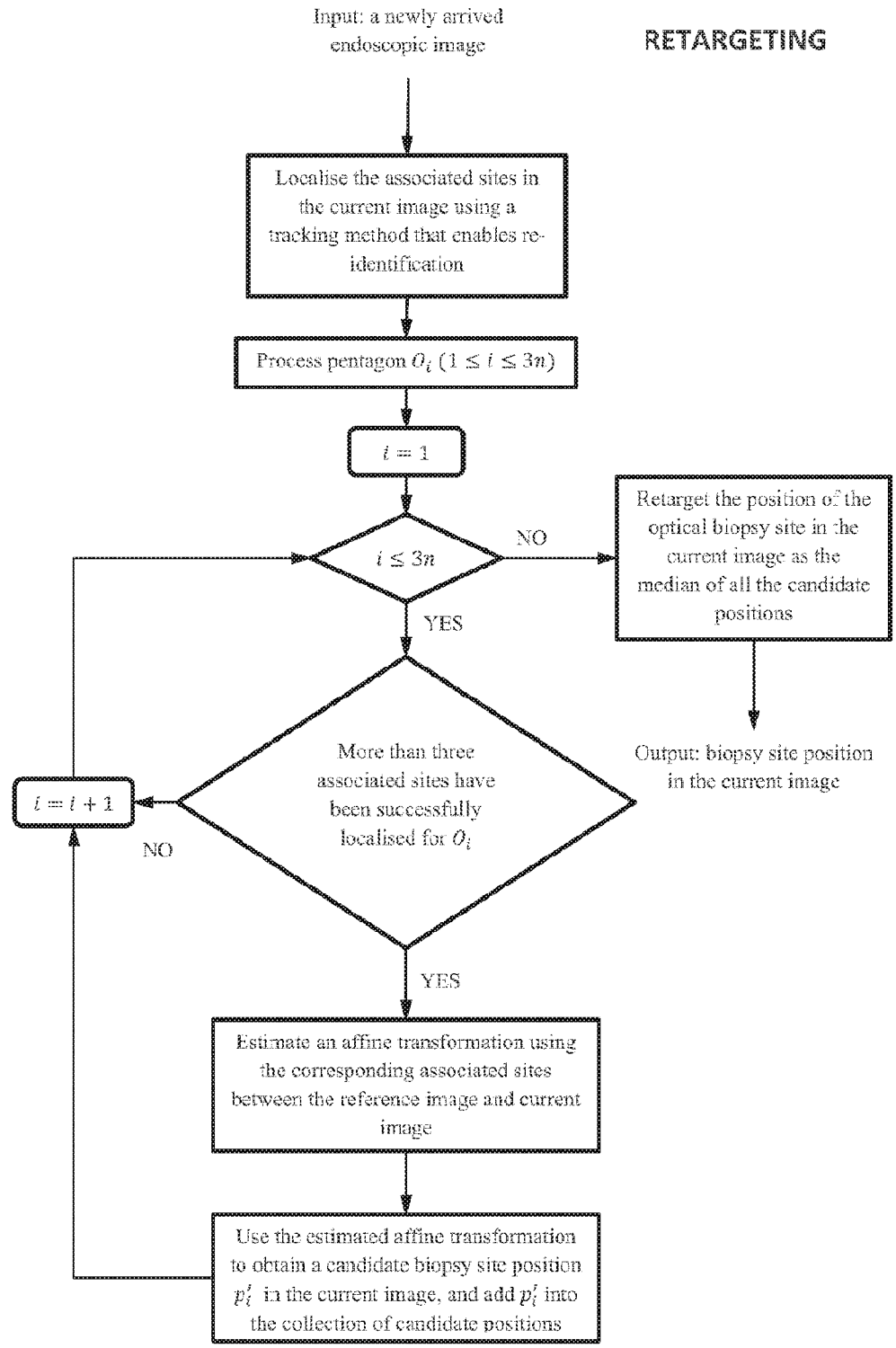

FIG. 2A and FIG. 2B illustrate a flow chart defining one example of a method of operating the apparatus of FIG. 1.

FIG. 2A illustrates a method of identifying a site at which a microscope image has been obtained, and selecting data to enable subsequent retargeting of that site. FIG. 2B illustrates a method of retargeting that site.

The method of FIG. 2A proceeds as follows. A macroscopic image of a tissue region is obtained, and in the event that no microscope image is obtained, a retargeting procedure is performed. The retargeting procedure is described below with reference to FIG. 2B.

In the event that a microscope image of a site in the endoscopic image is taken, the location of the site at which the microscope image was taken is obtained. To define the location of the site, a regular pentagon, O, of radius, $r_1$ is defined centred at the site position. Associated sites are then defined as rectangles of the image data centred at each vertex of this pentagon. Accordingly, this pentagon defines a set of non collinear locations at the vertices of the pentagon and a region of image data around each location. These may be referred to as a set of associated sites.

To define a plurality of sets of such regions 210, the initial pentagon is rotated through angles $\{\theta, 2\theta, \ldots, (n-1)\theta\}$, until $n\theta=72°$. Rectangular regions 210 of image data can then be centred at the pentagons' corner points 220 in each rotated position so that each of the n rotations provides a set of regions (associated sites) centred on the site at which the microscope image was obtained.

Groups of these sets of locations 210 are then provided by creating regular pentagons of different sizes centred at the site at which the microscope image was obtained, rotating each those pentagons through a set of angles, and defining rectangular regions of data around each vertex for each angle. For example, a second set of pentagons having radius $r_2$ can be defined, and a third set of pentagons having radius $r_3$, where $r_3>r_2>r_1$. Grouping these three sets together provides a distribution of locations which surround the site at which the microscope image was obtained and which are resolvable at different length scales.

FIG. 2B illustrates a method of retargeting a site. A macroscopic image is obtained, and to localise the site for retargeting, the regions of image data (associated sites) of each pentagon, O, of image data are compared with this current image.

Based on this comparison, a confidence interval can be assigned to the match between the region 210 of image data (associated site) and locations in the current image. If the best match (highest confidence level) is not greater than a selected threshold confidence, the region of image data cannot be assigned to a location in the current image.

If the location in the current image that provides the best match with the region 210 of image data also provides a confidence interval that is better than the selected threshold confidence, then the region of image data (associated site) is identified with that location in the current image.

If the locations of more than three regions of image data (associated sites) of the pentagon, O, are identified an affine transformation is estimated to transform the identified locations back onto the locations to which they correspond in the reference image. This affine transformation can then be used to estimate a candidate site location, in the current image, corresponding to the site at which the microscope image was obtained. This process is repeated for each pentagon for which at least three non-collinear locations can be identified to provide a collection of candidate positions. The median of the candidate positions is then determined to provide an estimate of the location, in the current image, of the site at which the microscope image was obtained.

As will be appreciated by the skilled addressee in the context of the present disclosure the confidence interval of a comparison of image data regions can be derived from statistical fables, or from numerically or analytically determined functions. Embodiments of the disclosure provide regular pentagons which may be centred at a biopsy site position, e.g. the location at which a microscope image has been obtained. The pentagons can created at different angles and scales. Such embodiments may have the following advantages: a) They may ensure enough point pairs to be used for Least-Squares algorithm; b) They may ensure non-collinearity for 2D affine transformation estimation; c) They may allow better performance under significant scale changes caused by camera zoom-in or zoom-out. Some embodiments of the disclosure determine the median of the candidate biopsy site positions, which may be obtained from all identifiable affine transformations generated from the pentagons. This may have the following advantages: a) It may provide a collection of candidates, so that an optimal position can be selected; b) The use of the median of the candidates may provide robustness to inaccurate candidate positions (outliers). Embodiments of the disclosure may also tracking the vertices of polygons, for example by comparing regions of image data around those vertices with image data in other images. This tracking method may tracks the corners of pentagons as rectangular regions. This may enable re-identification of targets when they move out of the field-of-view and then re-appear in the current image. The assumption that the local area around the optical biopsy site is rigid may enable the robustness of our method under tissue deformation. In addition, the use of tracking multiple surrounding regions around the optical biopsy site enables our method to perform under partial occlusion due to the presence of medical instruments in the field-of-view. An aspect of the disclosure provides a computer implemented method for tracking a site at which a microscope image has been obtained or optically identified, the method comprising identifying, in a macroscopic reference image of a tissue, a site in which a microscope image has been obtained or optically identified, selecting multiple (possibly at least three) non-collinear locations distributed around the site in the reference image; selecting, from the reference image, a region of image data around each of the at least three non collinear locations; comparing each selected region with a second image and, based on these comparisons, identifying for each selected region a corresponding location in the second image; determining a single common affine transformation to map the at least three locations from the reference image onto the corresponding locations in the second image.

The non collinear locations may be arranged at the vertices of a pentagon surrounding the target site. In an embodiment the use of a pentagon (or a higher order polygon) enables the detection of non-collinear points for defining the affine transformation, one can use more (seven, for example) or other polygons, which may be rotated by a predefined angle, possibly without overlapping, to achieve the same aim.

Also with this method, the target site can be occluded (e.g. during optical biopsy), because we rely on surrounding features, and it can still extrapolate to the probe location.

The following is a detailed description of the way in which the present invention may be considered. Whilst various features may be described as being essential or necessary, this may only be the case for the specific example discussed, for example due to other requirements imposed by the particular mathematical situation under consideration. These statements should not, therefore, be construed as limiting the present invention in anyway. The scope of the present disclosure is defined by the claims.

This particular example relates to

Pathological Site Retargeting under Tissue Deformation using Geometrical Association and Tracking Recent advances in microscopic detection techniques include fluorescence spectroscopy, fibred confocal microscopy and optical coherence tomography. These methods can be integrated with miniaturised probes to assist endoscopy, thus enabling diseases to be detected at an early and pre-invasive stage, forgoing the need for histopathological samples and off-line analysis. Since optical-based biopsy does not leave visible marks after sampling, it is important to track the biopsy sites to enable accurate retargeting and subsequent serial examination. In this paper, a novel approach is proposed for pathological site retargeting in gastroscopic examinations. The proposed method is based on affine deformation modelling with geometrical association combined with cascaded online learning and tracking. It provides online *in vivo* retargeting, and is able to track pathological sites in the presence of tissue deformation. It is also robust to partial occlusions and can be applied to a range of imaging probes including confocal laser endomicroscopy.

1 Introduction

Gastroscopy is the gold-standard method of visualising the upper gastrointestinal tract. In addition to direct visualisation of the mucosa, the procedure enables the procurement of histological samples important for the diagnosis and assessment of gastrointestinal pathologies. Recently, there has been an increasing demand for *in vivo*, *in situ* real-time tissue characterisation and assessment. Techniques that enable microscopic detection and characterisation of tissue include fluorescence spectroscopy, fibred confocal microscopy, and optical coherence tomography. These methods can be packaged into miniaturised probes that can be deployed through endoscopic instrument channels. They allow changes that occur in diseases such as cancer to be detected at an early and pre-invasive stage (without taking histopathological tissue samples). One of the major problems with the use of probe-based systems is its small field-of-view, hence systematically screening larger surface areas with surface deformation, such as the oesophagus becomes difficult. Retargeting previously probed mucosal sites is also challenging due to the lack of visible marks left on the mucosal surface. Recent adoption of Narrow Band Imaging (NBI) enhances the visibility of mucosal features, allowing the possibility of using computer vision approaches to assist pathological site retargeting in examinations of the upper gastrointestinal tract.

Methods of the present disclosure may enable online *in vivo* retargeting based on a learning-based tracker. A local geometrical association scheme is proposed to mitigate the problem of partial occlusion and feature drop-out during tracking, which also facilitates simultaneous tracking of multiple biopsy sites. The method provides reliable retargeting of pathological sites in the presence of tissue deformation. Detailed experimental validation with both phantom and *in vivo* endoscopic data has been performed and the results derived demonstrate its potential clinical value.

2 Methods

2.1 Local Affine Tissue Deformation Modelling

Tissue deformation causes general tracking methods in computer vision to fail. In this paper, we assume regional tissue deformation can be modelled by local affine transformations. With this assumption, the appearance of a local surface patch in two different views can be linked with an affine transformation.

Figure 3:
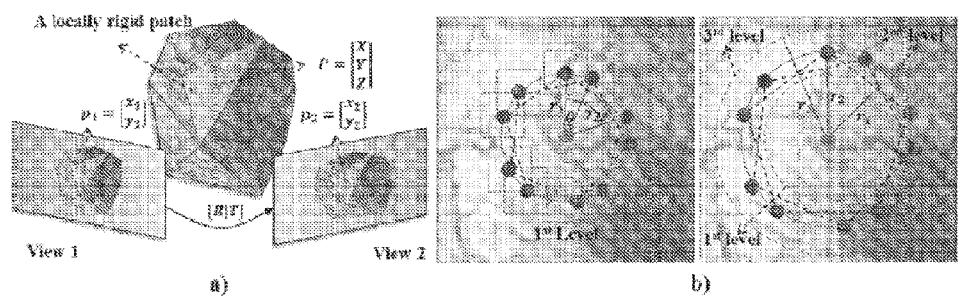
FIG. 3a) shows a 3D-2D reprojection of an arbitrary point P in a locally rigid patch reprojected back onto View 1 and View 2, represented by $p_1$ and $p_2$, respectively.
FIG. 3b) illustrates initialisation of geometrically associated sites, these start by creating associated sites with size $r_1$, three levels of association are initialised; the dash boxes represent the patches independently tracked by Tracking-Learning-Detection (TLD)

We denote the camera's intrinsic matrix as $K$ and extrinsic matrix as $[R|T]$ between two different views. For an *in vivo* environment with tissue deformation, the changes in the 3D position of the surface patch can also be incorporated into $[R|T]$. As shown in Fig. 3 a), an arbitrary 3D point in the surface patch is denoted as $P$. The goal is to show that there is a homography $H$ that satisfies $p_2 = H p_1$, where $p_1$ and $p_2$ are the 2D reprojection points of $P$ in View 1 and View 2, respectively. The homography can be obtained by projecting $p_1$ and $p_2$ to the same 3D point $P$, such that $$H = \left[ \frac{f_1}{f_2} K R K^{-1} \Big| \frac{1}{f_2} K T \right], \quad (1)$$

where $f_1$ and $f_2$ are the normalising factors for the two views. Since we consider small regions, $H$ can be approximated using a local affine transformation.

In our work, an optical biopsy site is retargeted using the affine transformation obtained from its tracked adjacent regions. This transformation is used to estimate the position of the pathological site in the current image. This is important as the target site does not always have identifiable surface features and the use of multiple surrounding landmarks would ensure both reliability and consistency under camera motion, tissue deformation and partial occlusion.

2.2 Tracking with Cascaded Online Learning

Tracking objects with online learning is a popular topic in computer vision. Methods [5,6] have been proposed to combine learning and tracking in an online framework. The tracker adopted in our work is the Tracking-Learning-Detection (TLD) method [7]. TLD consists of a median-flow tracker, a cascaded classifier and scanning-windows detection. When the tracker is able to provide the object location, the cascaded classifier, which contains a variance filter, a randomised fern filter and Nearest Neighbour (NN) classifier, is trained with the samples generated from detection and tracking. When the tracker fails in providing the object location, the patches generated from detection are regarded as potential candidates. These candidates are then filtered by the cascaded classifier that has been trained. The final remaining patch is identified as the object, and this reboots the tracking.

In this work, due to the requirement of tracking multiple surrounding regions, TLD is extended to independently track multiple surface patches. Therefore, we define the model map that contains the models of $N$ surrounding regions as $\{M_1, M_2, \ldots, M_N\}$, where $M_i = \{M_i^+, M_i^-\}$. $M_i^+ = \{s_1^+, s_2^+, \ldots, s_{l_i}^+\}$ and $M_i^- = \{s_1^-, s_2^-, \ldots, s_{k_i}^-\}$ represent the collections of $l_i$ positive and $k_i$ negative samples of region $i$, respectively. the initialisation of $M_i$ is achieved by generating affine-transformed positive samples, which enables rotation invariance, and high-variance negative samples.

2.3 Geometrical Association for Retargeting

Using the local affine transformation and the multiple-object TLD mentioned earlier, a retargeting framework based on local geometrical association has been proposed. A pathological site is retargeted using the affine transformation obtained from its surrounding regions, which are called associated sites.

Least-squares [8] is applied to calculate the transformation using at least four pairs of corresponding associated sites. It is essential for least-squares that the positions of these associated site should be non-colinearly distributed during initialisation. To ensure enough non-colinear associated sites can be tracked for affine transformation estimation, the following steps are used for initialisation. Firstly, a regular pentagon with size $r_1$ (Fig. 3 b)) is created and centred at the 2D position of the pathological site, $p_{init}$, which can be obtained from the operator's input or probe detection during a probe-based confocal laser endomicroscopy (pCLE) procedure. The corner points of the pentagon are defined as the centres of the associated sites independently tracked by TLD. The pentagon is then rotated with regard to the centre by angles $\{\theta, 2\theta, \ldots, (n-1)\theta\}$ until $n\theta = 72°$ (note the pentagon is rotationally symmetric), where $n$ is the number of pentagons. For each angle setting, five associated sites are created for tracking. We define these as the $1^{st}$ level for the associated sites. To take into account changes in scale, pentagons of multiple sizes are used to create associated sites. In a similar procedure as above, pentagons of size $r_2$ and $r_3$ ($r_3 > r_2 > r_1$) are used to create the $2^{nd}$ and $3^{rd}$ level of the associated sites, respectively.

In this paper, three levels of pentagons $\{O_1, O_2, \ldots, O_{3n}\}$ are initialised. Once there are $k$ ($k \geq 4$) associated sites of one pentagon $O_i$ successfully identified in the current image, an affine transformation can be obtained by minimising:

$$c(H_i) = \frac{1}{k} \sum_{j=1}^{k} (q_j - H_i p_j)^2, \qquad (2)$$

with $p_j$ and $q_j$ being one pair of the corresponding associated sites between two images. It should be noted that the 2D positions of the sites are defined as the centres of the patches tracked by TLD. The transformation $H_i$ estimated by Eq. 2 is then applied to calculate a candidate position of the site in the current image with $p'_i = H_i p_{init}$. A collection of candidate sites $\{p'_1, p'_2, \ldots, p'_m\}$, where $m \leq 3n$, is obtained by searching for all pentagons that provide affine transformations. The final coordinates of the site in the current image are chosen as the median values of all the candidate sites, which provides robustness against noise.

3 Results and Validation

3.1 Parameter Configuration

Figure 4:
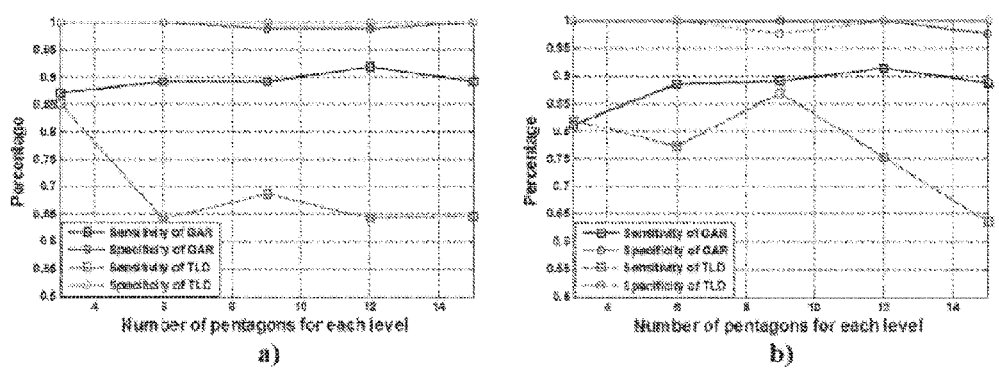
FIG. 4 illustrates sensitivity and specificity test of the proposed Geometrically Associated Retargeting (GAR) and TLD. a) Results for site 1 with five different pentagon settings; b) Results for site 2 with five different pentagon settings. True Positives: correctly identified sites that are pathological; True Negatives: correctly rejected sites that are not pathological; False Positives: incorrectly identified sites that are not pathological; False Negatives: incorrectly rejected sites that are pathological.

Prior to the use of the proposed method based on multi-object TLD, the parameters mentioned above related to geometrical association need to be determined. To this end, a detailed sensitivity and specificity analysis has been performed with known ground truth. The patch size ($width \times height$) of the associated sites tracked by TLD is typically $60 \times 60$. The sizes of the pentagons in different levels are then defined as $r_1 = \lambda width$, $r_2 = (\lambda + 0.1) width$ and $r_3 = (\lambda + 0.2) width$, where $\lambda = 0.2$ is the control element that is determined empirically to constrain the total area of the associated sites to be a locally rigid patch (for the approximation of deformation). We perform our method on phantom data with $n = 3, 6, 9, 12,$ and $15$ pentagons for each level to retarget two different sites. The sensitivity and specificity measures are summarised in Fig. 4 a) and b). TLD has also been performed on the same two sites. It should be noted that our proposed method can achieve an improved performance than the original TLD. It is evident that the setting of 12 pentagons gives the best performance, and therefore is used for all the experiments conducted in this paper.

3.2 Validation

Figure 5:
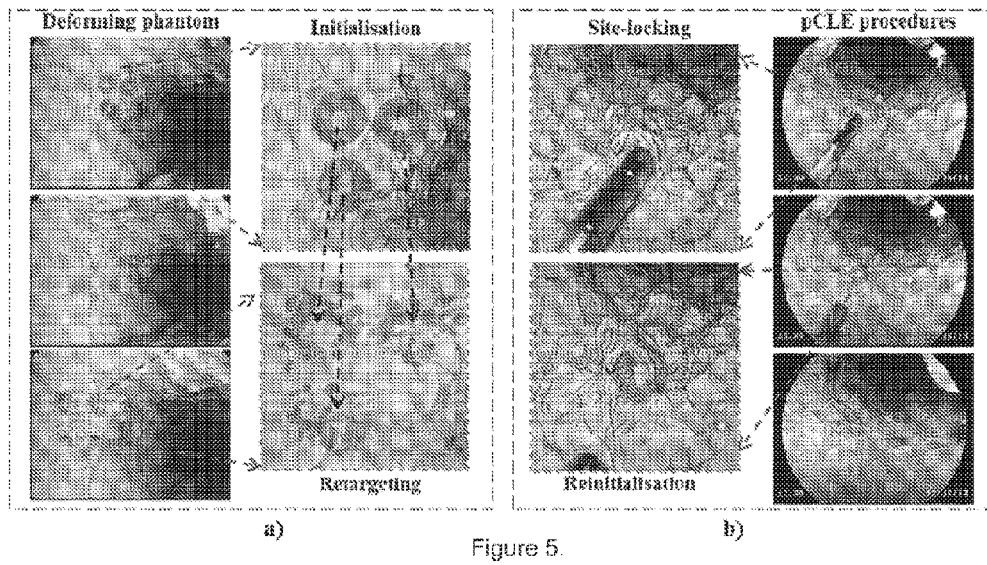
FIG. 5 illustrates a) Retargeting on deforming phantom with multiple site tracking; b) Retargeting in simulated pCLE procedures with site-locking and reinitialisation in these drawings dark grey rings represent the locations of associated sites; c) in the initialisation and retargeting phase shown in the arrows illustrated in broken lines represent the mapping of pathological sites from initialisation to retargeting.
Figure 6:
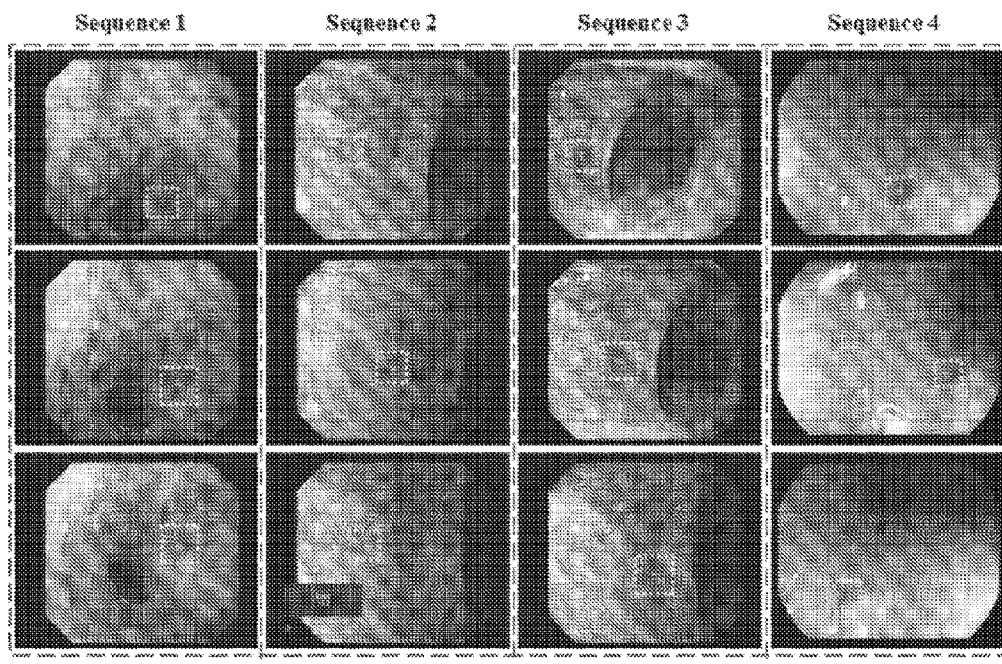
FIG. 6 illustrates a proposed retargeting method performed on in vivo data, showing four in vivo video sequences acquired using Olympus NBI and PENTAX i-Scan endoscopies.

Deforming phantom. The proposed method is tested on an oesophageal phantom that simulates the textural 'mucosal' features enhanced with NBI as well as irregular deformation . Fig. 5 a) shows the retargeting of multiple pathological sites. Three video sequences of a deforming phantom have been processed and three sites have been selected for validation. As the phantom surface is deforming, ground truth (reprojections of the sites in images) can only be generated with an expert's observations. By comparing the results with the ground truth, visual angle errors adopted in [2] have been estimated using the camera intrinsic parameters. The average visual angle errors are presented in Table 1 (Site No. 1 – 3) and the sensitivity (recall) and specificity values range from 0.9231 to 0.9722 and 0.9310 to 1, respectively. The precision values range from 0.9459 to 1.

Pathological Site Retargeting under Tissue Deformation

Table 1. Quantitative evaluation results of the proposed retargeting approach on ten pathological sites, being represented as Average Visual Angle Error (AVAE) [2], AVAE in X-dimension (AVAEX), and AVAE in Y-dimension (AVAEY). The numbers in the brackets represent the percentage of field-of-view.

| | Deforming phantom | | | PCLE procedure | | | In vivo data | | | |
|---|---|---|---|---|---|---|---|---|---|---|
| Site No. | 1 | 2 | 3 | 4 | 5 | 6 | 7 | 8 | 9 | 10 |
| AVAE | 0.51° | 0.64° | 0.35° | 2.49° | 2.79° | 2.62° | 2.71° | 0.79° | 1.68° | 0.87° |
| | (0.54%) | (0.67%) | (0.37%) | (2.61%) | (2.93%) | (2.75%) | (1.51%) | (0.44%) | (0.94%) | (0.48%) |
| AVAEX | 0.36° | 0.27° | 0.24° | 1.73° | 1.69° | 1.68° | 1.32° | 0.39° | 0.95° | 0.63° |
| | (0.48%) | (0.37%) | (0.32%) | (2.32%) | (2.27%) | (2.25%) | (0.94%) | (0.28%) | (0.67%) | (0.45%) |
| AVAEY | 0.27° | 0.56° | 0.20° | 1.29° | 1.98° | 1.74° | 2.24° | 0.64° | 1.28° | 0.51° |
| | (0.46%) | (0.94%) | (0.33%) | (2.19%) | (3.35%) | (2.94%) | (2.00%) | (0.57%) | (1.14%) | (0.44%) |

Simulation with pCLE retargeting. The proposed method has also been validated in simulated pCLE procedures in a phantom environment. Partial instrument occlusions exist in the procedures. To deal with this, we perform an additional step that locks the site where the probe has touched. This site-locking step is achieved using the proposed geometrical association scheme (see Section 2.3) but only with one level of pentagons of size $2width$. After the probe moves away from the site, the locked site is reinitialised with the aforementioned multi-scale pentagons (Fig. 5 b)). Blob detection is performed to identify the movement of the probe. For validation, electromagnetic sensors (Aurora, NDI) are attached to the camera and the probe (Mauna Kea Technologies) so that the 3D position of the site can be obtained. Given that the phantom is static, the site position in the 3D space is reprojected onto the image using the world-to-sensor transformation from Aurora and sensor-to-camera transformation from hand-eye calibration [9]. The reprojections of the site in the images are defined as the ground truth, which are then compared with the results from the proposed approach. Quantitative results are presented in Table 1 (Site No. 4 – 6).

*In vivo* data validation. In addition to phantom validation, *in vivo* gastroscopic data is also processed. The validation is performed by comparing the ground truth from expert observations and the estimated site locations from our approach. Four *in vivo* sequences (three sequences with Olympus NBI, one sequence with PENTAX i-Scan endoscopy) are presented in Fig. 4. Our method is able to perform retargeting in the presence of tissue deformation. The average visual angle errors provided in Table 1 (Site No. 7 – 10) range from 0.87° to 2.71°. The precision values range from 0.5833 to 1. The sensitivity (recall) and specificity values range from 0.3529 to 0.8824 and 0.6000 to 1, respectively. The results show lower sensitivity and specificity measures in *in vivo* data than that of the phantom experiment. This is because fast *in vivo* endoscopic motion results in blurred images, causing poor textural information to be gleaned for retargeting. In addition, dark illuminating conditions on the pathological site also leads to less reliable textural information. Nevertheless, our proposed method provides consistently low visual angle errors for both phantom and *in vivo* data.

4 Conclusion

In this paper, we have proposed an online deformable approach for pathological site retargeting in endoscopic examinations. The proposed approach performs online learning-based tracking to re-identify optical biopsy sites. By modelling tissue deformation as local affine transformations, our approach is able to handle realistic motion as encountered in typical *in vivo* endoscopic examinations. The proposed geometrical association scheme provides the flexibility of being able to be applied to general probe-based microscopic detection techniques such as pCLE. The method has been validated using deforming phantom data, simulated pCLE procedures, as well as *in vivo* gastroscopic data. It has been demonstrated that the method can accurately retarget pathological sites online in deformable environments, thus enabling its practical use in endoscopy.

Acknowledgements. The authors would like to thank Dr. Selen Atasoy, Dr. Jonathan Hoare and Prof. Alexander Meining for data sharing and collection.

References

1. Atasoy, S., Glocker, B., Giannarou, S., Mateus, D., Meining, A., Yang, G.Z., Navab, N.: Probabilistic region matching in narrow-band endoscopy for targeted optical biopsy. In: Yang, G.Z., Hawkes, D., Rueckert, D., Noble, A., Taylor, C. (eds.) MICCAI 2009, Part I. LNCS, vol. 5761, pp. 499–506. Springer, Heidelberg (2009)
2. Mountney, P., Giannarou, S., Elson, D., Yang, G.Z.: Optical biopsy mapping for minimally invasive cancer screening. In: Yang, G.Z., Hawkes, D., Rueckert, D., Noble, A., Taylor, C. (eds.) MICCAI 2009, Part I. LNCS, vol. 5761, pp. 483–490. Springer, Heidelberg (2009)
3. Allain, B., Hu, M., Lovat, L.B., Cook, R.J., Vercauteren, T., Ourselin, S., Hawkes, D.J.: Re-localisation of a biopsy site in endoscopic images and characterisation of its uncertainty. Med. Image Anal. 16(2), 482–496 (2012)
4. Atasoy, S., Mateus, D., Meining, A., Yang, G., Navab, N.: Endoscopic video manifolds for targeted optical biopsy. IEEE Trans. Med. Imag. 31(3), 637–653 (2012)
5. Mountney, P., Yang, G.Z.: Soft tissue tracking for minimally invasive surgery: Learning local deformation online. In: Metaxas, D., Axel, L., Fichtinger, G., Szkely, G. (eds.) MICCAI 2008, LNCS, vol. 5242, pp. 364–372. Springer, Heidelberg (2008)
6. Babenko, B., Yang, M.H., Belongie, S.: Robust object tracking with online multiple instance learning. IEEE Trans. Pattern Anal. Mach. Intell. 33(8), 1619–1632 (2011)
7. Kalal, Z., Mikolajczyk, K., Matas, J.: Tracking-learning-detection. IEEE Trans. Pattern Anal. Mach. Intell. 34(7), 1409–1422 (2012)
8. Umeyama, S.: Least-squares estimation of transformation parameters between two point patterns. IEEE Trans. Pattern Anal. Mach. Intell. 13(4), 376–380 (1991)
9. Tsai, R.Y., Lenz, R.K.: A new technique for fully autonomous and efficient 3d robotics hand/eye calibration. IEEE Trans. Robot. Autom. 5(3), 345–358 (1989)

The invention claimed is:

1. A computer implemented image processing method for tracking a site in a series of images, the method comprising
identifying a site to be tracked through the series of images;
selecting at least three non-collinear locations distributed around the site in a reference image of the series of images;
selecting, from the reference image, a region of image data around each of the at least three non collinear locations;
comparing each selected region of image data with image data from a second image of the series of images and, based on these comparisons, identifying, for each selected region, a corresponding location in the second image,
determining a single common affine transformation to map the at least three locations from the reference image onto the corresponding locations in the second image, and using the single common affine transformation for tracking the site from the reference image to the second image.

2. The method of claim 1 in which comparing each selected region of image data with image data from the second image comprises determining a correlation function between the selected region and the second image.

3. The method of claim 1 in which the at least three non-collinear locations comprise at least four non-collinear locations.

4. The method of claim 3 in which the at least four non-collinear locations define a regular polygon in the reference image.

5. The method of claim 3 in which the at least four non collinear locations define a pentagon in the reference image.

6. A tangible non-transitory computer readable medium comprising program instructions which when executed by a processor cause the processor to perform the method of claim 1.

7. A computer implemented method for tracking a site in a series of images, the method comprising
identifying a site to be tracked;
selecting at least four non collinear locations distributed around the site in the reference image, wherein the at least four non collinear locations are selected to define a regular polygon in the reference image;
comparing the reference image with a second image and, based on the comparison, identifying for each of the at least four non collinear locations, a corresponding location in the second image,
determining a common affine transformation to map the at least four locations from the reference image onto the corresponding locations in the second image.

8. The method of claim 7 further comprising selecting, from the reference image, a region of image data around each of the at least four non-collinear locations, wherein comparing the reference image with the second image comprises comparing each selected region with a second image and, based on these comparisons, identifying for each selected region a corresponding location in the second image.

9. The method of claim 7 comprising selecting a plurality of sets of non-collinear locations, wherein each corresponds to the locations of at least one of the other sets rotated about a common centre of the locations in which the locations of each set are centred on the identified site.

10. The method of claim 9 wherein the angle of rotation between each set may be an integer multiple of a selected wherein the selected angle is selected based on a rotational symmetry of the polygon.

11. The method of claim 9 comprising determining, for each of the plurality of sets of locations in the reference image, a common affine transform that maps all of the locations of that set to a corresponding set of locations in the second image to provide a plurality of common affine transforms, each of which maps a set of the locations of the reference image to a corresponding set of locations in the second image.

12. The method of claim 11 comprising determining a location of a site in the second image that corresponds to the identified site in the reference image based on the plurality of common affine transforms.

13. The method of claim 12 comprising combining the plurality of affine transforms to provide a single affine transform which maps the site in the reference image to a corresponding site in the second image, wherein combining comprises determining a central statistical moment.

14. A computer implemented method for tracking a site in a series of images, the method comprising
identifying a site to be tracked;
selecting a plurality of sets of at least three non-collinear locations, wherein each set of locations is distributed around the site in the reference image;
comparing the reference image with a second image and, based on the comparison, identifying for each set of at least three non collinear locations, a corresponding set of locations in the second image,
for each set, determining an affine transformation to map the at least three locations of the set to the corresponding set of locations in the second image,
for each affine transformation determining, based on the affine transformation, the location of a candidate site in the second image corresponding to the identified site in the reference image to provide a plurality of candidate sites; combining the plurality of candidate sites to locate the identified site in the second image.

15. The method of claim 14 wherein the at least three non collinear locations comprise at least four non collinear locations selected to define a regular polygon in the reference image.

16. The method of claim 14 further comprising selecting, from the reference image, a region of image data around each non collinear location of each set, wherein comparing the reference image with the second image comprises comparing each selected region with the second image and, based on these comparisons, identifying for each selected region of the set a corresponding location in the second image.

17. The method of claim 16 wherein comparing each selected region with the second image comprises determining a correlation function between the selected region and the second image.

18. The method of claim 14 comprising selecting a first group of non collinear locations distributed around the identified site, and selecting a second group of non collinear locations distributed around the identified site, wherein the first group is distributed around a smaller area of the image than the second group.

19. An apparatus comprising:
a first imager for obtaining images of a first field of view;
a second imager, having a second field of view and being operable to be moved within the first field of view to obtain images of a local region of the first field of view;

a controller, coupled to the first imager, and configured to:
  identify, in a reference image obtained by the first imager, a site at which the second imager has obtained an image;
  and to perform a method comprising:
    identifying a site to be tracked through the series of images;
    selecting at least three non-collinear locations distributed around the site in a reference image of the series of images;
    selecting, from the reference image, a region of image data around each of the at least three non collinear locations;
    comparing each selected region of image data with image data from a second image of the series of images and, based on these comparisons, identifying for each selected region a corresponding location in the second image,
    determining a single common affine transformation to map the at least three locations from the reference image onto the corresponding locations in the second image thereby to identify the location of a corresponding site in the second image wherein the second image is obtained by the first imager.

20. The apparatus of claim 19 wherein the second imager comprises a confocal laser microscope, and the apparatus is configured to perform probe-based Confocal Laser Endomicroscopy (pCLE).

* * * * *